(12) United States Patent
MacDonald et al.

(10) Patent No.: US 10,919,794 B2
(45) Date of Patent: Feb. 16, 2021

(54) METHOD OF CUTTING GLASS USING A LASER

(71) Applicant: GENERAL ATOMICS, San Diego, CA (US)

(72) Inventors: James Ross MacDonald, San Diego, CA (US); Esteban Balarezo Bagdy, San Diego, CA (US); Mark Aoraha Cacause, El Cajon, CA (US); Jeffrey James Trial, San Diego, CA (US)

(73) Assignee: GENERAL ATOMICS, San Diego, CA (US)

( * ) Notice: Subject to any disclaimer, the term of this patent is extended or adjusted under 35 U.S.C. 154(b) by 510 days.

(21) Appl. No.: 15/831,215

(22) Filed: Dec. 4, 2017

(65) Prior Publication Data

US 2019/0169062 A1 Jun. 6, 2019

(51) Int. Cl.
*B23K 26/00* (2014.01)
*B23K 26/08* (2014.01)
(Continued)

(52) U.S. Cl.
CPC ...... *C03B 33/0222* (2013.01); *B23K 26/0006* (2013.01); *B23K 26/0622* (2015.10); *B23K 26/0869* (2013.01); *B23K 26/16* (2013.01); *B23K 26/18* (2013.01); *B23K 26/402* (2013.01); *B23K 26/57* (2015.10); *B23K 26/60* (2015.10);
(Continued)

(58) Field of Classification Search
CPC . C03B 33/0222; C03B 33/037; C03B 33/033; C03B 33/102; B23K 26/18; B23K 26/402; B23K 26/60; B23K 26/16; B23K 26/0869; B23K 26/0006; B23K 26/57;
(Continued)

(56) References Cited

U.S. PATENT DOCUMENTS 5,801,356 A 9/1998 Richman
5,987,920 A 11/1999 Bosman
(Continued)

FOREIGN PATENT DOCUMENTS

CN 105149796 12/2015
EP 3179504 6/2017
(Continued)

OTHER PUBLICATIONS

Search Report for GB Patent Application No. GB1817458.1 mailed from the UK Intellectual Property Office dated Mar. 12, 2019.
(Continued)

*Primary Examiner* — Nahida Sultana
(74) *Attorney, Agent, or Firm* — Fitch, Even, Tabin & Flannery LLP

(57) ABSTRACT

A method having steps of placing a glass sheet having a front surface, a reverse surface and a thickness onto a sacrificial substrate; directing a beam from a laser at the front surface and through the glass sheet; pulsing the beam at a frequency of between 10 kHz and 30 kHz, and at the sacrificial substrate; moving the beam across the glass sheet at a rate of between 30 millimeters per second and 90 millimeters per second; ablating the sacrificial substrate with the beam; generating a superheated vapor in response to the ablating of the sacrificial substrate; and ablating the reverse surface of the glass sheet with the superheated vapor, whereby the glass sheet is cut.

18 Claims, 4 Drawing Sheets

(51) Int. Cl.
*C03B 33/02* (2006.01)
*B23K 26/60* (2014.01)
*B23K 26/402* (2014.01)
*B23K 26/18* (2006.01)
*B23K 26/0622* (2014.01)
*B23K 26/57* (2014.01)
*B23K 26/16* (2006.01)
*C03B 33/033* (2006.01)
*C03B 33/037* (2006.01)
*B23K 103/00* (2006.01)

(52) U.S. Cl.
CPC .......... *C03B 33/033* (2013.01); *C03B 33/037* (2013.01); *B23K 2103/54* (2018.08)

(58) Field of Classification Search
CPC ............ B23K 26/0622; B23K 2103/54; B23K 26/361; B23K 26/38; B26D 2210/00
See application file for complete search history.

(56) References Cited

U.S. PATENT DOCUMENTS

| | | | |
|---|---|---|---|
| 6,130,401 A | 10/2000 | Yoo | |
| 6,437,282 B1* | 8/2002 | Thornton | B29C 65/54 |
| | | | 219/121.69 |
| 7,157,038 B2 | 1/2007 | Baird | |
| 7,173,212 B1* | 2/2007 | Semak | B23K 26/0604 |
| | | | 219/121.69 |
| 8,822,882 B2 | 9/2014 | Liu | |
| 8,943,855 B2 | 2/2015 | Gomez | |
| 9,321,126 B2 | 4/2016 | Xu | |
| 9,656,910 B2 | 5/2017 | Bazemore | |
| 2003/0228470 A1* | 12/2003 | Allaire | C03C 17/3405 |
| | | | 428/426 |
| 2004/0013951 A1 | 1/2004 | Wang | |
| 2004/0195221 A1* | 10/2004 | Haglund, Jr. | H01L 21/4803 |
| | | | 219/121.69 |
| 2006/0021978 A1* | 2/2006 | Alexeev | B23K 26/40 |
| | | | 219/121.72 |
| 2006/0054606 A1* | 3/2006 | Amako | B23K 26/064 |
| | | | 219/121.73 |
| 2006/0151450 A1* | 7/2006 | You | C03B 33/093 |
| | | | 219/121.67 |
| 2011/0266264 A1 | 11/2011 | Rumsby | |
| 2014/0093693 A1 | 4/2014 | Zhang | |
| 2016/0322291 A1 | 11/2016 | Goers | |
| 2017/0008122 A1 | 1/2017 | Wieland | |
| 2018/0321566 A1 | 11/2018 | Geerlings | |

FOREIGN PATENT DOCUMENTS

| | | |
|---|---|---|
| JP | S63215394 | 9/1988 |
| JP | 2013082565 | 5/2013 |
| WO | 2016081395 | 5/2016 |

OTHER PUBLICATIONS

Nikumb et al; "Precision glass machining, drilling and profile cutting by short pulse lasers"; Thin Solid Films 477 (2005); Apr. 22, 2005; pp. 216-221; http://www.sciencedirect.com/science/article/pii/S0040609004012933.

* cited by examiner

METHOD OF CUTTING GLASS USING A LASER

BACKGROUND OF THE INVENTION

1. Field of the Invention

The present invention relates generally to cutting glass, and more specifically to cutting glass using a laser.

2. Discussion of the Related Art

Various systems and processes are known in the art for cutting glass. However, cutting glass using a scribing wheel or other scribing methods may involve scratching the glass in order to cause the glass to break at a predictable location when flexed. In some cases, mechanical methods may even break the glass. Thus, cutting glass may break the glass or create an unusable shape, which may reduce the effective yield of the cutting process.

SUMMARY OF THE INVENTION

Cutting glass sheets may be accomplished using a laser. Specifically, a laser may be used to cut thin glass sheets (i.e., less than 300 μm thick). A substrate may be used beneath the glass sheets to facilitate the cutting.

In one embodiment, a method may include placing a glass sheet having a front surface, a reverse surface and a thickness onto a sacrificial substrate, directing a beam from a laser at the front surface and through the glass sheet, pulsing the beam at a frequency of between 10 kHz and 30 kHz, and at the sacrificial substrate, moving the beam across the glass sheet at a rate of between 30 millimeters per second and 90 millimeters per second, ablating the sacrificial substrate with the beam, generating a superheated vapor in response to the ablating of the sacrificial substrate, and ablating the reverse surface of the glass sheet with the superheated vapor, whereby the glass sheet is cut. One suitable laser is a yttrium orthovanadate (YVO4).

Other lasers having a suitable frequency for ablating the substrate through a glass sheet, such as solid state lasers (Nd:YAG), gas lasers (CO2), semiconductor lasers (AlGaAs, AlGaInP, GaN, etc.) and fiber lasers (Nd/Yb doped fiber), can also be employed in lieu of the yttrium orthovanadate (YVO4) laser, provided that the glass is optically transparent at the light wavelength produced by the laser.

In another embodiment, a non-transitory computer-readable medium may include instructions operable to cause a processor to place a glass sheet having a front surface, a reverse surface and a thickness onto a sacrificial substrate, direct a beam from a laser at the front surface and through the glass sheet, pulse the beam at a frequency of between 10 kHz and 30 kHz, and at the sacrificial substrate, move the beam across the glass sheet at a rate of between 30 millimeters per second and 90 millimeters per second, ablate the sacrificial substrate with the beam, generate a superheated vapor in response to the ablating of the sacrificial substrate, and ablate the reverse surface of the glass sheet with the superheated vapor, whereby the glass sheet is cut.

In a further embodiment, a system may include one or more components configured to place a glass sheet having a front surface, a reverse surface and a thickness onto a sacrificial substrate, direct a beam from a laser at the front surface and through the glass sheet, pulse the beam at a frequency of between 10 kHz and 30 kHz, and at the sacrificial substrate, move the beam across the glass sheet at a rate of between 30 millimeters per second and 90 millimeters per second, ablate the sacrificial substrate with the beam, generate a superheated vapor in response to the ablating of the sacrificial substrate, and ablate the reverse surface of the glass sheet with the superheated vapor, whereby the glass sheet is cut.

In an additional embodiment, an apparatus may include means for placing a glass sheet having a front surface, a reverse surface and a thickness onto a sacrificial substrate, means for directing a beam from a laser at the front surface and through the glass sheet, means for pulsing the beam at a frequency of between 10 kHz and 30 kHz, and at the sacrificial substrate, means for moving the beam across the glass sheet at a rate of between 30 millimeters per second and 90 millimeters per second, means for ablating the sacrificial substrate with the beam, means for generating a superheated vapor in response to the ablating of the sacrificial substrate, and means for ablating the reverse surface of the glass sheet with the superheated vapor, whereby the glass sheet is cut.

In some examples of the method, non-transitory computer-readable medium, system, and apparatus described above, the directing comprises directing a beam from a YVO4 laser at the front surface having a spot size of less than 5 micrometers.

In some examples of the method, non-transitory computer-readable medium, system, and apparatus described above, the placing comprises placing a glass onto a sacrificial substrate of lavastone.

In some examples of the method, non-transitory computer-readable medium, system, and apparatus described above, the placing comprises placing a glass onto a sacrificial substrate of wonderstone.

In some examples of the method, non-transitory computer-readable medium, system, and apparatus described above, the placing comprises placing a glass onto a sacrificial substrate of silicon nitride.

In some examples of the method, non-transitory computer-readable medium, system, and apparatus described above, the placing comprises placing a glass onto a sacrificial substrate of metal.

In some examples of the method, non-transitory computer-readable medium, system, and apparatus described above, the placing comprises placing a glass onto a sacrificial substrate of paper.

Some examples of the method, non-transitory computer-readable medium, system, and apparatus described above may further include processes, features, means, or instructions for generating a powder in response to the ablating of the sacrificial substrate.

Some examples of the method, non-transitory computer-readable medium, system, and apparatus described above may further include processes, features, means, or instructions for ultrasonically cleaning the glass sheet after the glass sheet may be cut.

In some examples of the method, non-transitory computer-readable medium, system, and apparatus described above, the sacrificial substrate may be combusted based on the ablating.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
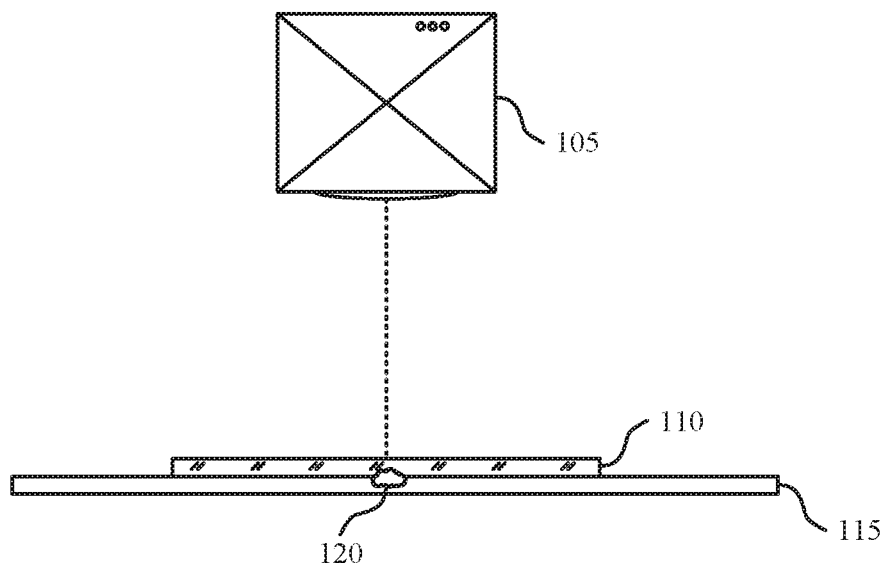
FIGS. 1 through 2 show diagrams of a glass cutting system that supports cutting glass using an yttrium orthovanadate (YVO4) laser in accordance with aspects of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring to FIG. 1, shown is a diagram of a glass cutting system 100 that supports cutting glass using an yttrium orthovanadate (YVO4) laser 105 in accordance with aspects of the present disclosure. The system 100 may include: a laser 105, a glass sheet 110, a substrate 115, and a superheated vapor 120. In some cases, the laser 105 is a YV04 laser. However, other lasers having a suitable frequency for ablating the substrate 115 through glass sheet 110 may be used, such as solid state lasers (Nd:YAG), gas lasers (CO2), semiconductor lasers (AlGaAs, AlGaInP, GaN, etc.) and fiber lasers (Nd/Yb doped fiber) can also be employed in lieu of the yttrium orthovanadate (YVO4) laser 105, provided that the glass is optically transparent at the light wavelength produced by the laser.

The laser 105 is a device that emits light from the stimulated emission of electromagnetic radiation. Stimulated emission is the release of photons from electrons transitioning from higher to lower energy states. By subjecting the matter to a magnetic field, the probability of an atom entering a specific transition state is greatly increased, allowing for control over the frequency of the emitted light. Light emitted from the laser 105 is emitted coherently, meaning that any light from the laser 105 has a constant phase difference, same frequency, and same waveform.

The laser 105 may ablate the sacrificial substrate 115 with the beam; generate a superheated vapor 120 in response to the ablating of the sacrificial substrate 115; ablate the reverse surface of the glass sheet 110 with the superheated vapor 120, whereby the glass sheet 110 is cut; and generate a powder in response to the ablating of the sacrificial substrate 115. In some cases, the sacrificial substrate 115 is combusted based on the ablating. Spatial coherence allows a laser 105 to be focused to a small area, which enables applications such as laser burning and cutting. The laser 105 may incorporate aspects of a laser 210 as described with reference to FIG. 2.

A substrate 115 may be used to laser cut a glass sheet 110. For example, the glass sheet 100 to be cut may be placed above the substrate 115, and the laser 105 may be directed through the glass sheet 110 into the substrate 115. In some examples, the substrate 115 may be sacrificial, reusable, or both (that is, in some cases, a sacrificial substrate 115 may be used a finite number of times before it is fully consumed). The laser 105 may pass through the glass sheet 110 and ablate and/or combust the substrate 115 underneath the glass sheet 110 in a very small area. If there is any residual powder on the glass sheet 110, the residual powder may be ultrasonically cleansed off or wiped off of the glass sheet 110 with a cloth, a solvent, or both.

In some cases, a substrate 115 may be chosen specifically because it produces a residual powder because the production of residual powder may be correlated with a substrate 115 that is effective at cutting the glass sheet 110. Different materials may be used as the substrate 115. Optically dark colored ceramics, such as lavastone, wonderstone, and silicon nitride may be more suitable than other materials as the substrate 115. In some cases, light-colored ceramics such as boron nitride may be less suitable as the substrate 115. Metals and printer paper may also be used as the substrate 115. The focused and superheated vapor 120 from the substrate 115 may ablate the reverse surface of the glass sheet 110.

Figure 2:
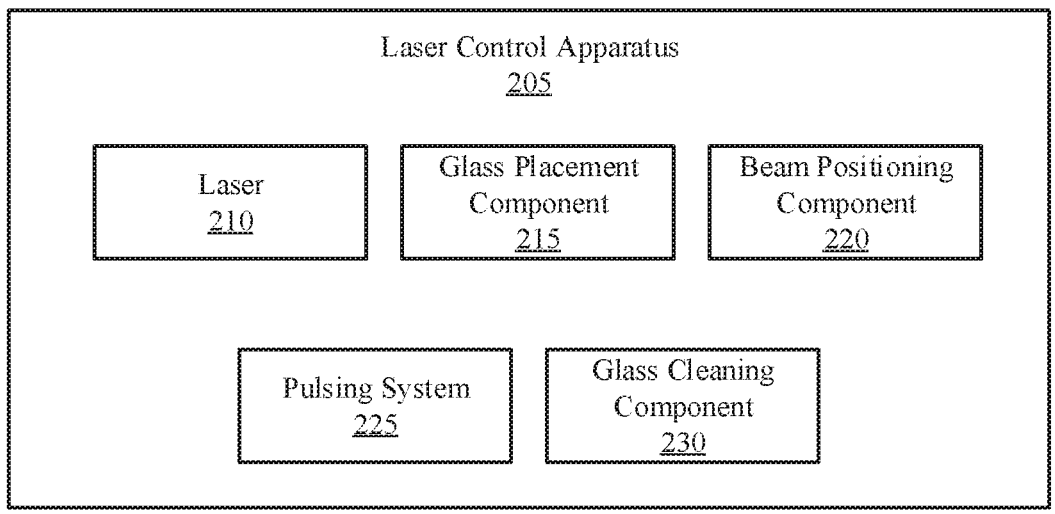

FIG. 2 shows a diagram 200 of a glass cutting system including laser control apparatus 205 that supports cutting glass using a YVO4 laser 210 in accordance with aspects of the present disclosure. In some examples, laser control apparatus 205 may include: a laser 210, a glass placement component 215, a beam positioning component 220, a pulsing system 225, and a glass cleaning component 230.

Cutting glass sheets may be accomplished using the laser 210 or by mechanical methods. Mechanical cutting methods may include creating cracks in the glass sheet by direct abrasion with tools such as a diamond or carbide scribing wheel. Scribing may result in micro-cracks, chipping, and low cut accuracy. Post-processing of the cut glass sheet may involve time-consuming methods to remove the damage caused by mechanical cutting methods.

The laser 210 may be used to cut the glass sheet. Spatial coherence allows the laser 210 to be focused to a small area. In some cases, light emitted from some lasers may be absorbed by the glass to cause thermal stress and cut the glass. In some cases, a laser may heat the glass, which may become molten and result in rounded, less defined edges. Thus some lasers, such as a carbon dioxide (CO2) laser, may not be suitable for finely detailed cuts. For example, the diffraction limited spot size for a CO2 laser may be around 55 μm, which may prevent cutting features smaller than this. Some lasers may also be limited in cutting speed.

For example, a CO2 laser may only cut as fast as 33 mm/s. Thus, the YVO4 laser 210 may be used to cut thin glass sheets (i.e., less than 300 μm thick).

In some examples, the YVO4 laser 210 may be pulsed, and produce light with a wavelength of 1064 nm. For example, the laser 210 may be pulsed at high power (~25 W) at 10-30 kHz. The YVO4 1064 nm laser 210 may have a 1 μm-5 μm spot size, which may be significantly lower than other glass cutting lasers. This method may be used to cut glass as thin as 25 μm, or as thick as 200 μm, with almost perfect yield. This method may also be capable of cutting complex shapes at speeds up to 90 mm/s. Thus, using a YVO4 laser 210 may allow for increased yield of ultra-thin glass for a multitude of applications.

The laser 210 may cut thin glass sheets according to the following process: ablate the sacrificial substrate with the beam; generate a superheated vapor in response to the ablating of the sacrificial substrate; and ablate the reverse surface of the glass sheet with the superheated vapor, whereby the glass sheet is cut. In some cases, the laser 210 may generate a powder in response to the ablating of the sacrificial substrate. In some cases, the sacrificial substrate is combusted. The laser 210 may incorporate aspects of the laser 105 as described with reference to FIG. 1.

The glass placement component 215 may place a glass sheet having a front surface, a reverse surface and a thickness onto a sacrificial substrate. In some cases, the placing comprises placing a glass onto a sacrificial substrate of lavastone. In some cases, the placing comprises placing a glass onto a sacrificial substrate of wonderstone. In some cases, the placing comprises placing a glass onto a sacrificial substrate of silicon nitride. In some cases, the placing comprises placing a glass onto a sacrificial substrate of metal. In some cases, the placing comprises placing a glass onto a sacrificial substrate of paper. The placement component can be a fixture designed to hold the glass in place while it is being cut by the laser.

The beam positioning component 220 may direct a beam from a YVO4 laser 210 at the front surface of the glass sheet and through the glass sheet. The beam positioning component 220 may move the beam across the glass sheet at a rate of between 30 millimeters per second and 90 millimeters per second. In some cases, the directing comprises directing a beam from the YVO4 laser 210 at the front surface having a spot size of less than 5 micrometers. The beam positioning component 220 can include a chamber protected by an interlock where the cutting occurs. The chamber includes a hole on the top for the laser. In operation, the laser is placed on top of this chamber and covers this hole. The laser cuts through the hole.

The pulsing system 225 may pulse the beam at a frequency of between 10 kHz and 30 kHz, and at the sacrificial substrate.

The glass cleaning component 230 may ultrasonically cleanse the glass sheet after the glass sheet is cut.

Figure 3:
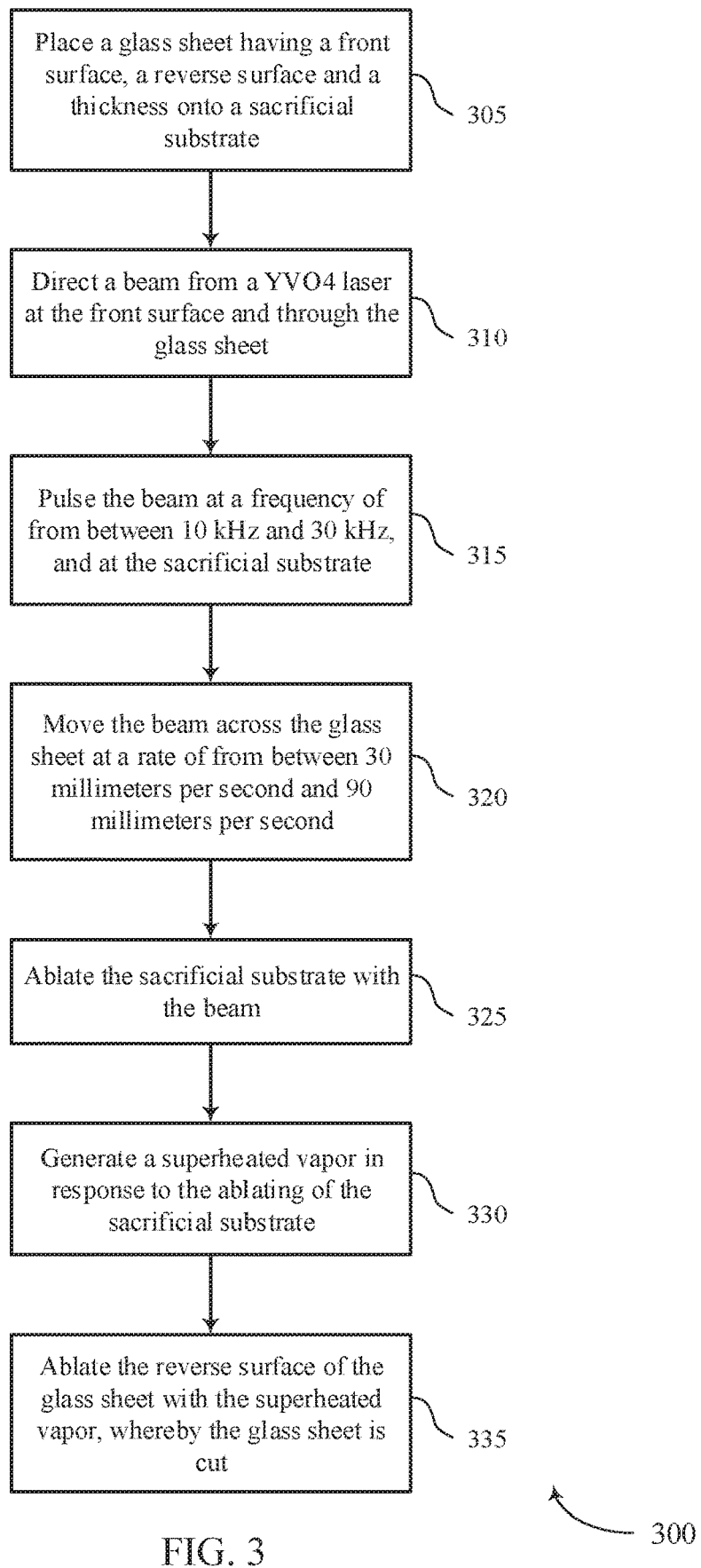
FIGS. 3 through 4 show flowcharts of a process for cutting glass using a YVO4 laser in accordance with aspects of the present disclosure.

FIG. 3 shows a flowchart 300 of a process for cutting glass using a YVO4 laser in accordance with aspects of the present disclosure.

In some examples, a glass cutting system may execute a set of codes to control functional elements of the glass cutting system to perform the described functions. Additionally, or alternatively, a glass cutting system may perform these using special-purpose hardware.

At block 305 the glass cutting system may place a glass sheet having a front surface, a reverse surface and a thickness onto a sacrificial substrate. These operations may be performed according to the methods and processes described in accordance with aspects of the present disclosure. For example, the operations may be composed of various substeps, or may be performed in conjunction with other operations described herein. In certain examples, aspects of the described operations may be performed by glass placement component 215 as described with reference to FIG. 2.

At block 310 the glass cutting system may direct a beam from a YVO4 laser at the front surface and through the glass sheet. These operations may be performed according to the methods and processes described in accordance with aspects of the present disclosure. For example, the operations may be composed of various substeps, or may be performed in conjunction with other operations described herein. In certain examples, aspects of the described operations may be performed by beam positioning component 220 as described with reference to FIG. 2.

At block 315 the glass cutting system may pulse the beam at a frequency of between 10 kHz and 30 kHz, and at the sacrificial substrate. These operations may be performed according to the methods and processes described in accordance with aspects of the present disclosure. For example, the operations may be composed of various substeps, or may be performed in conjunction with other operations described herein. In certain examples, aspects of the described operations may be performed by pulsing system 225 as described with reference to FIG. 2.

At block 320 the glass cutting system may move the beam across the glass sheet at a rate of between 30 millimeters per second and 90 millimeters per second. These operations may be performed according to the methods and processes described in accordance with aspects of the present disclosure. For example, the operations may be composed of various substeps, or may be performed in conjunction with other operations described herein. In certain examples, aspects of the described operations may be performed by beam positioning component 220 as described with reference to FIG. 2.

At block 325 the glass cutting system may ablate the sacrificial substrate with the beam. These operations may be performed according to the methods and processes described in accordance with aspects of the present disclosure. For example, the operations may be composed of various substeps, or may be performed in conjunction with other operations described herein. In certain examples, aspects of the described operations may be performed by the laser 105, 210 as described with reference to FIGS. 1 and 2.

At block 330 the glass cutting system may generate a superheated vapor in response to the ablating of the sacrificial substrate. These operations may be performed according to the methods and processes described in accordance with aspects of the present disclosure. For example, the operations may be composed of various substeps, or may be performed in conjunction with other operations described herein. In certain examples, aspects of the described operations may be performed by laser 105, 210 as described with reference to FIGS. 1 and 2.

At block 335 the glass cutting system may ablate the reverse surface of the glass sheet with the superheated vapor, whereby the glass sheet is cut. These operations may be performed according to the methods and processes described in accordance with aspects of the present disclosure. For example, the operations may be composed of various substeps, or may be performed in conjunction with other operations described herein. In certain examples, aspects of the described operations may be performed by the laser 105, 210 as described with reference to FIGS. 1 and 2.

Figure 4:
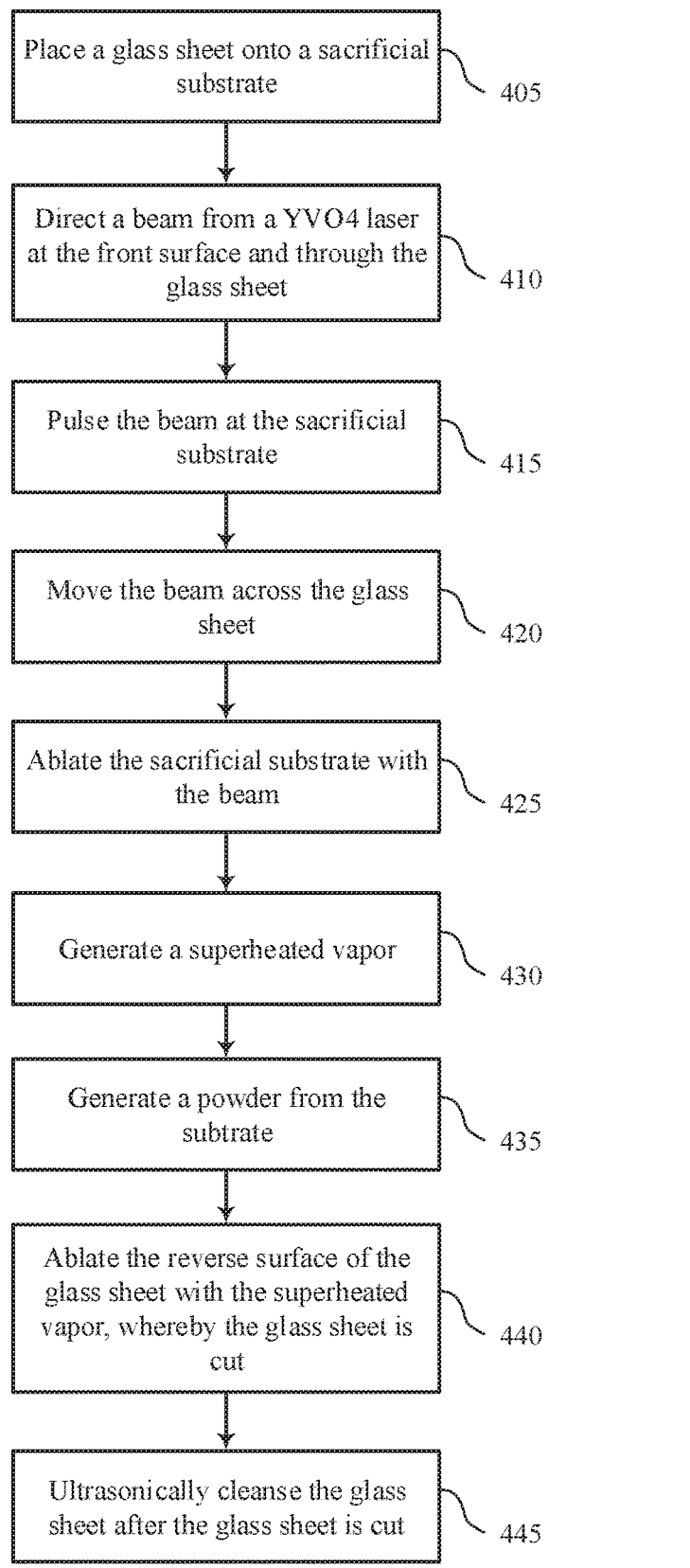

FIG. 4 shows a flowchart 400 of a process for cutting glass using a YVO4 laser in accordance with aspects of the present disclosure. In some examples, a glass cutting system may execute a set of codes to control functional elements of the glass cutting system to perform the described functions. Additionally, or alternatively, a glass cutting system may perform these using special-purpose hardware.

At block 405 the glass cutting system may place a glass sheet onto a sacrificial substrate. These operations may be performed according to the methods and processes described in accordance with aspects of the present disclosure. For example, the operations may be composed of various substeps, or may be performed in conjunction with other operations described herein. In certain examples, aspects of the described operations may be performed by glass placement component 215 as described with reference to FIG. 2.

At block 410 the glass cutting system may direct a beam from a YVO4 laser at the front surface and through the glass sheet. These operations may be performed according to the methods and processes described in accordance with aspects of the present disclosure. For example, the operations may be composed of various substeps, or may be performed in conjunction with other operations described herein. In certain examples, aspects of the described operations may be performed by beam positioning component 220 as described with reference to FIG. 2.

At block 415 the glass cutting system may pulse the beam at the sacrificial substrate. These operations may be performed according to the methods and processes described in accordance with aspects of the present disclosure. For example, the operations may be composed of various substeps, or may be performed in conjunction with other operations described herein. In certain examples, aspects of the described operations may be performed by pulsing system 225 as described with reference to FIG. 2.

At block 420 the glass cutting system may move the beam across the glass sheet. These operations may be performed according to the methods and processes described in accordance with aspects of the present disclosure. For example, the operations may be composed of various substeps, or may be performed in conjunction with other operations described herein. In certain examples, aspects of the described operations may be performed by beam positioning component 220 as described with reference to FIG. 2.

At block 425 the glass cutting system may ablate the sacrificial substrate with the beam. These operations may be performed according to the methods and processes described in accordance with aspects of the present disclosure. For example, the operations may be composed of various substeps, or may be performed in conjunction with other operations described herein. In certain examples, aspects of the described operations may be performed by laser 105 and 210 as described with reference to FIGS. 1 and 2.

At block 430 the glass cutting system may generate a superheated vapor. These operations may be performed according to the methods and processes described in accordance with aspects of the present disclosure. For example, the operations may be composed of various substeps, or may be performed in conjunction with other operations described herein. In certain examples, aspects of the described operations may be performed by laser 105 and 210 as described with reference to FIGS. 1 and 2.

At block 435 the glass cutting system may generate a powder. These operations may be performed according to the methods and processes described in accordance with aspects of the present disclosure. For example, the operations may be composed of various substeps, or may be performed in conjunction with other operations described herein. In certain examples, aspects of the described operations may be performed by laser 105 and 210 as described with reference to FIGS. 1 and 2.

At block 440 the glass cutting system may ablate the reverse surface of the glass sheet with the superheated vapor, whereby the glass sheet is cut. These operations may be performed according to the methods and processes described in accordance with aspects of the present disclosure. For example, the operations may be composed of various substeps, or may be performed in conjunction with other operations described herein. In certain examples, aspects of the described operations may be performed by the laser 105, 210 as described with reference to FIGS. 1 and 2.

At block 445 the glass cutting system may ultrasonically cleanse the glass sheet after the glass sheet is cut. These operations may be performed according to the methods and processes described in accordance with aspects of the present disclosure. For example, the operations may be composed of various substeps, or may be performed in conjunction with other operations described herein. In certain examples, aspects of the described operations may be performed by glass cleaning component 230 as described with reference to FIG. 2.

Some of the functional units described in this specification have been labeled as modules, or components, to more particularly emphasize their implementation independence. For example, a module may be implemented as a hardware circuit comprising custom VLSI (very large-scale integration) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for cutting a glass sheet having a front surface, a reverse surface, and a thickness, comprising:
 a sacrificial substrate, wherein the glass sheet is placed onto the sacrificial substrate such that the reverse surface faces the sacrificial substrate;
 a laser, wherein the glass sheet is interposed between the sacrificial substrate and the laser;
 a pulsing system coupled to the laser, wherein the pulsing system pulses a beam from the laser at a frequency of from between 10 kHz and 30 kHz; and
 a laser control apparatus coupled to the laser, wherein the laser control apparatus is adapted to:
  direct a beam from the laser at the front surface of the glass sheet and through the glass sheet onto the sacrificial substrate;
  move the beam across the glass sheet at a rate of between 30 millimeters per second and 90 millimeters per second;
  ablate the sacrificial substrate with the beam;
  generate a superheated vapor in response to the ablating of the sacrificial substrate; and
  ablate the reverse surface of the glass sheet with the superheated vapor in response to the superheated vapor being generated, whereby the glass sheet is cut.

2. The system of claim 1, wherein:
 the directing comprises directing a beam from a laser at the front surface having a spot size of less than 5 micrometers.

3. The system of claim 1, wherein:
 the placing comprises placing a glass onto a sacrificial substrate of lavastone.

4. The system of claim 1, wherein:
 the placing comprises placing a glass onto a sacrificial substrate of wonderstone.

5. The system of claim 1, wherein:
 the placing comprises placing a glass onto a sacrificial substrate of silicon nitride.

6. The system of claim 1, wherein:
 the placing comprises placing a glass onto a sacrificial substrate of metal.

7. The system of claim 1, wherein the system is further configured to:
 generate a powder in response to the ablating of the sacrificial substrate.

8. The system of claim 7, wherein the system is further configured to:
 ultrasonically cleanse the glass sheet after the glass sheet is cut.

9. The system of claim 1, wherein:
 the sacrificial substrate is combusted based on the ablating.

10. An apparatus for cutting glass, comprising:
 means for placing a glass sheet having a front surface, a reverse surface and a thickness onto a sacrificial substrate such that the reverse surface faces the sacrificial substrate;
 means for directing a beam from a laser at the front surface and through the glass sheet;
 means for pulsing the beam at a frequency of between 10 kHz and 30 kHz, and at the sacrificial substrate;
 means for moving the beam across the glass sheet at a rate of between 30 millimeters per second and 90 millimeters per second;
 means for ablating the sacrificial substrate with the beam;
 means for generating a superheated vapor in response to the ablating of the sacrificial substrate; and
 means for ablating the reverse surface of the glass sheet with the superheated vapor in response to the superheated vapor being generated, whereby the glass sheet is cut.

11. The apparatus of claim 10, wherein:
 the directing comprises directing a beam from a laser at the front surface having a spot size of less than 5 micrometers.

12. The apparatus of claim 10, wherein:
 the placing comprises placing a glass onto a sacrificial substrate of lavastone.

13. The apparatus of claim 10, wherein:
 the placing comprises placing a glass onto a sacrificial substrate of wonderstone.

14. The apparatus of claim 10, wherein:
 the placing comprises placing a glass onto a sacrificial substrate of silicon nitride.

15. The apparatus of claim 10, wherein:
 the placing comprises placing a glass onto a sacrificial substrate of metal.

16. The apparatus of claim 10, further comprising:
 means for generating a powder in response to the ablating of the sacrificial substrate.

17. The apparatus of claim 16, further comprising:
 means for ultrasonically cleaning the glass sheet after the glass sheet is cut.

18. The apparatus of claim 10, wherein:
 the sacrificial substrate is combusted based on the ablating.

* * * * *